United States Patent
Sova

(10) Patent No.: US 6,266,890 B1
(45) Date of Patent: Jul. 31, 2001

(54) DRILL DIRECTOR

(76) Inventor: Jacob William Sova, 450 Victor Way, Wyckoff, NJ (US) 07481

( * ) Notice: Subject to any disclaimer, the term of this patent is extended or adjusted under 35 U.S.C. 154(b) by 0 days.

(21) Appl. No.: 09/519,632

(22) Filed: Mar. 6, 2000

(51) Int. Cl.$^7$ ................................................. B23B 47/28
(52) U.S. Cl. ........................................ 33/638; 408/115 R
(58) Field of Search ........................ 33/638; 408/115 R, 408/97, 110, 115 B, 72 B, 241 B, 241 G; 144/106

(56) References Cited

U.S. PATENT DOCUMENTS

| | | | | |
|---|---|---|---|---|
| 3,086,408 | * | 4/1963 | Donals | 408/115 R |
| 3,119,286 | * | 1/1964 | Forman et al. | 408/110 |
| 3,534,639 | * | 10/1970 | Treichler | 408/115 R |
| 4,132,496 | * | 1/1979 | Casto | 408/115 R |
| 4,199,283 | * | 4/1980 | Perry | 408/115 R |
| 4,391,558 | * | 7/1983 | Perry | 408/115 R |

FOREIGN PATENT DOCUMENTS

815360 * 6/1959 (GB) ................................... 408/110

* cited by examiner

*Primary Examiner*—Andrew H. Hirshfeld

(57) ABSTRACT

An assembly for accurately and easily drilling holes at a desired angle relative to a work piece. The assembly includes a housing having a rotatable drill guide therein. The drill guide includes a tang extending out from a side of the housing so that it can be manually rotated to position the drill guide in a desired orientation. Angular markings are provided on the side of the housing to align with a groove on the tang. The drill guide is biased towards an insert guide to create an opening whose size is adjustable for receiving drill bits of varying sizes.

3 Claims, 2 Drawing Sheets

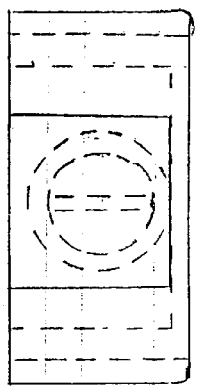 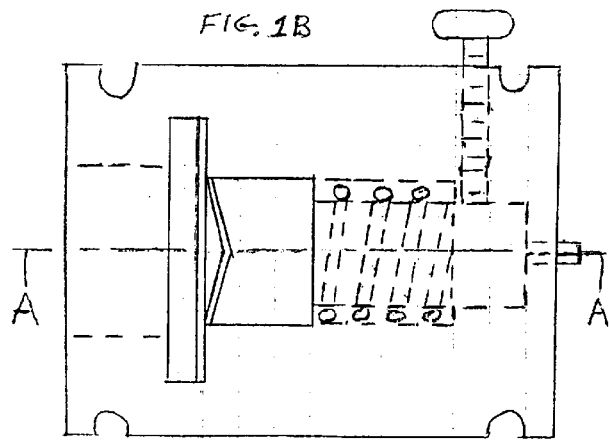 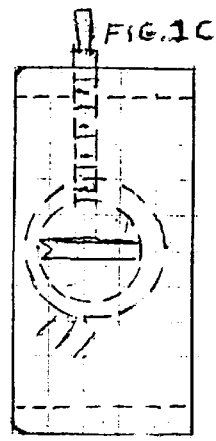
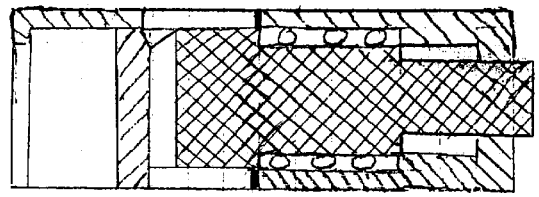

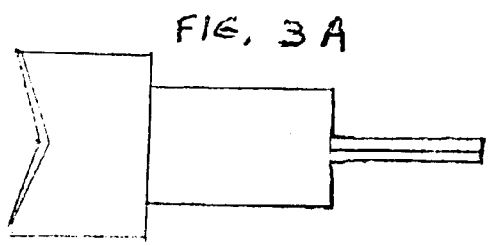
FIG. 3A
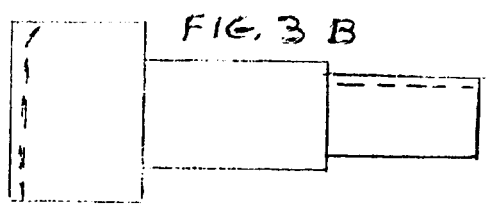
FIG. 3B
FIG. 3C  FIG. 3D
 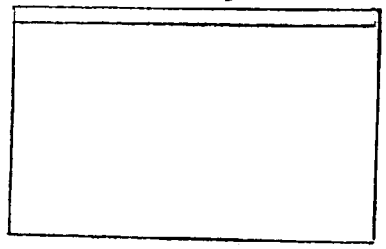
FIG. 3E
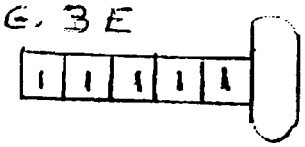
FIG. 3F  FIG. 3G
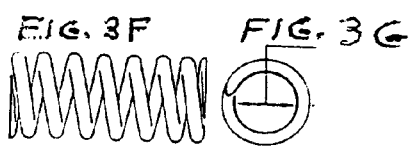

DRILL DIRECTOR

BACKGROUND OF THE INVENTION

This invention is a device to assist professionals and do-it-yourself persons in drilling straight or angular holes precisely in exact desired locations. The simplicity of this invention allows skilled or unskilled persons to drill holes accurately, normally and efficiently each and every time without wondering where the drill bit will exit, especially when drilling thick materials.

This invention can be adjusted to drill angular or straight holes accurately. During the drilling operation, all the user needs to do is set the invention for the drill bit diameter and for the angle to be drilled, then hold, clamp, or fasten the invention to the object to be drilled. No special skills are required.

This invention's compact size including only a few parts makes it easy to manufacture with minimal cost. Therefore the invention can be affordable by all persons. The ease of use of the invention guarantees accurately positioned drill holes, which fulfills consumer's needs.

BRIEF SUMMARY OF THE INVENTION

This invention is a low cost consumer oriented tool designed for use by any person, regardless of skill level, to drill holes safely and accurately. This invention completely eliminates the wonder and fear of where the drill bit will exit on the opposite side of the piece being drilled.

This invention's size allows it to be used anywhere a power or manual drilling unit can be utilized. This invention is self adjusting to suit all diameter drill bits and is very easily changed to the desired angle required.

The operational simplicity of this invention involves:
1—inserting the drill bit;
2—turning the drill to the angle required;
3—tightening the locking screw; and
4—drilling the hole.

BRIEF DESCRIPTION OF THE DRAWINGS

FIGS. 1A, 1B and 1C are left side, top, and right side views, respectively, of the device of the present invention.

FIG. 2 is a view of the device of the invention taken along line "A—A" of FIG. 1B.

FIGS. 3A and 3B are top and front views of the drill guide of the present invention.

FIGS. 3C and 3D are front and side views of the insert guide of the present invention.

FIG. 3E is a side view of the locking screw of the present invention.

FIGS. 3F and 3G are front and side views of the compression spring of the present invention.

DETAILED DESCRIPTION OF THE INVENTION

The purpose of this invention is to allow skilled or laypersons to drill any diameter hole at any angle (including straight) accurately, quickly and without entailing a great deal of time or costly effort.

In FIGS. 1A, 1B and 1C, there is shown the assembly of the invention's left, top, and right views, respectively. FIG. 2 is a cross section of the invention taken along line "A—A" of FIG. 1B to show how the components of the invention are assembled and function as a unit.

In FIGS. 3A–3G, there is shown the individual components of the invention, which include drill guide 11, insert guide 8, locking screw 4, and compression spring 6.

When a drill bit is inserted between the "V" section 14 of drill guide 11 and insert guide 8, drill guide 11 automatically squeezes the compression spring 6, which creates a tension on the inserted drill bit, thus making the drill bit fit perfectly between the "V" section 14 of the drill guide 11 and the insert guide 8. After a drill bit is inserted and pressed by the drill guide 11 against the insert guide 8, the locking screw 4 is tightened to prevent movement of the drill guide 11. This makes a snug or perfect fit for the drill bit.

With housing 3 held on the work piece, the drilling of the hole will be guided by the invention and will produce a hole exactly as desired.

Bevel 9 on insert 8 and bevel 15 on drill guide 11 allow a drill bit to be pressed between them without damaging the cutting edges of the drill bit. To drill the desired angle or straight hole properly, a person must rotate the tang 12 of the drill guide 11. When the line groove 13 on the tang 12 is aligned with the desired angle marking 17 located on the right side of the housing 3, then the locking screw 4 must be tightened. Now, the invention is ready to be used for drilling.

The housing 3 can be hand held, clamped or fastened to the work piece through the housing openings 18.

To reduce wear on the drill guide 11 and the insert guide 9, these parts can be coated with a hard coating, can be made of a hard material, or can be made of a soft material and later hardened.

What is claimed is:

1. A drilling assembly for accurately drilling a hole in a work piece, said drilling assembly comprising:

a housing having a bottom surface and a side surface extending from the bottom surface, said bottom surface being for placement against said work piece and said side surface having angular markings thereon;

a drill guide rotatably positioned within said housing and having a tang extending outwardly from said housing through said side surface, said tang having line means for aligning with said angular markings to position said drill guide at a desired angle relative to said housing and said work piece, said drill guide having a substantially V-shaped end surface;

an insert guide positioned within said housing adjacent to said V-shaped end surface of said drill guide; said drill guide being biased towards said insert guide to create an opening of adjustable size between said V-shaped end surface of said drill guide and said insert guide for reception of a drill bit; and a locking screw extending into said housing for being tightened against said drill guide to secure said drill guide at the desired angle.

2. The drilling assembly of claim 1, wherein said V-shaped end surface of said drill guide and said insert guide both include a bevel to facilitate insertion of the drill bit within said opening.

3. The drilling assembly of claim 1, wherein said line means is a groove in said tang.

* * * * *